US009131717B2

(12) United States Patent
Akinruli et al.

(10) Patent No.: US 9,131,717 B2
(45) Date of Patent: Sep. 15, 2015

(54) SHELF-STABLE BEVERAGE COMPOSITION

(75) Inventors: Helen Akinruli, Danbury, CT (US); Cynthia Clark, Yorktown Heights, NY (US); Rama Gadiraju, White Plains, NY (US)

(73) Assignee: PEPSICO, INC., Purchase, NY (US)

( * ) Notice: Subject to any disclaimer, the term of this patent is extended or adjusted under 35 U.S.C. 154(b) by 2186 days.

(21) Appl. No.: 12/096,988

(22) PCT Filed: Dec. 30, 2005

(86) PCT No.: PCT/US2005/047604
§ 371 (c)(1),
(2), (4) Date: Sep. 24, 2008

(87) PCT Pub. No.: WO2007/078293
PCT Pub. Date: Jul. 12, 2007

(65) Prior Publication Data
US 2009/0196955 A1    Aug. 6, 2009

(51) Int. Cl.
*A23L 1/236* (2006.01)
*A23L 1/302* (2006.01)
*A23L 2/38* (2006.01)
*A23L 2/60* (2006.01)
*A23L 2/44* (2006.01)

(52) U.S. Cl.
CPC ............... *A23L 1/236* (2013.01); *A23L 1/2362* (2013.01); *A23L 2/44* (2013.01); *A23L 2/60* (2013.01)

(58) Field of Classification Search
CPC ............. A23L 2/385; A23L 2/70; A23L 2/44; A23L 1/236; A23L 1/2362; A23L 2/02; A23L 2/60
USPC ........................................................ 426/590
See application file for complete search history.

(56) References Cited

U.S. PATENT DOCUMENTS

| 4,303,684 | A | * | 12/1981 | Pitchon et al. ............... 426/312 |
| 4,808,428 | A | * | 2/1989 | Forsstrom et al. ............ 426/569 |
| 5,474,791 | A | | 12/1995 | Zablocki et al. |
| 6,245,373 | B1 | | 6/2001 | Baron et al. |
| 6,326,040 | B1 | * | 12/2001 | Kearney et al. ............... 426/271 |
| 2002/0009530 | A1 | | 1/2002 | DuBois et al. |
| 2003/0124200 | A1 | | 7/2003 | Stone |
| 2003/0203004 | A1 | * | 10/2003 | Kelm et al. .................... 424/439 |
| 2004/0115329 | A1 | * | 6/2004 | Tamiya et al. ................. 426/599 |
| 2004/0219274 | A1 | * | 11/2004 | Cook ............................ 426/590 |
| 2005/0037121 | A1 | | 2/2005 | Rathjen |
| 2005/0238779 | A1 | | 10/2005 | Isoya et al. |

FOREIGN PATENT DOCUMENTS

| CA | 2 273 277 | 7/1998 |
| CN | 1354626 | 6/2002 |
| JP | 9-509327 | 9/1997 |
| JP | 09313901 | 12/1997 |
| JP | 2004520072 | 7/2004 |
| JP | 2005304440 | 11/2005 |
| WO | 9522910 | 8/1995 |
| WO | 9626648 A1 | 9/1996 |
| WO | 99-38390 | 8/1999 |
| WO | 01-06872 | 2/2001 |
| WO | 02087358 | 11/2002 |
| WO | 2004095952 | 11/2004 |
| WO | 2005/013728 | 2/2005 |
| WO | 2005009147 A1 | 2/2005 |

OTHER PUBLICATIONS

International Search Report dated May 16, 2006 (PCT/US2005/047604).
Characterization and use in food of Acesulfame potassium "Sunett", Food Science, Japan, vol. 32 No. 5, pp. 92-103, dated Apr. 10, 2000.
Corresponding Japanese Patent Application No. 2008-548490, Official Action, Dated Mar. 30, 2010 (With English Translation).
Extended European Search Report received for corresponding European Application 05856074.9-1211 dated Feb. 3, 2011.
First Office Action for corresponding Chinese Patent Application 200580052415.2 dated Sep. 14, 2010.
CN Office Action dated Dec. 9, 2011, received in corresponding Application No. 2005800052415.2.

* cited by examiner

*Primary Examiner* — Michele Jacobson
*Assistant Examiner* — Jeffrey Mornhinweg
(74) *Attorney, Agent, or Firm* — Banner & Witcoff, Ltd.

(57) ABSTRACT

A shelf-stable, non-refrigerated reduced-calorie beverage that contains about 8 to about 12% fruit juice by volume is provided. The beverage contains at least one nutritive sweetener and at least one non-nutritive sweetener. Preferably, the equivalent sucrose sweetness ratio of the at least one non-nutritive sweetener to all of the total sweeteners is from about 0.35 to about 0.45. Preferably, the at least one non-nutritive sweetener comprises aspartame and acesulfame potassium.

17 Claims, No Drawings

SHELF-STABLE BEVERAGE COMPOSITION

TECHNICAL FIELD

The invention relates to beverages. More particularly, the present invention relates to shelf-stable, reduced-calorie beverages that contain fruit juice.

BACKGROUND OF THE INVENTION

Juice drinks typically have high calorie content. A need exists for a juice type beverage that has reduced calories with good taste and reduced sweetener aftertaste compared to diet beverages.

Merely diluting juice reduces flavor, mouthfeel, and nutritional value while reducing calories. A need exists for a dilute juice beverage that has good flavor, mouthfeel, and nutritional value with reduced calories.

A need also exists for such a beverage that is shelf stable without requiring expensive retorting, aseptic processing or tunnel pasteurization and packaging. A need also exists for a beverage that should be shelf stable for extended periods of time without cold storage and that can be cold-filled.

SUMMARY OF THE INVENTION

In accordance with one aspect of the invention, a beverage composition is provided. The beverage in accordance with the invention can be shelf stable for extended periods of time without refrigeration while maintaining a good flavor and appearance, contains about 8% to 12% juice by volume, has reduced calories and can contain an artificial sweetener or sweeteners but with substantially reduced artificial sweetener aftertaste.

In one embodiment, the beverage composition has at least one nutritive sweetener and acesulfame potassium and aspartame. The acesulfame potassium and aspartame typically are present in an equivalent sucrose sweetness ratio of acesulfame potassium to aspartame of from about 0.35 to about 0.70 and preferably in the range of from about 0.45 to about 0.55. The beverage composition contains about 8% to about 12% juice by volume of the total composition and has a calorie content of from about 25 to about 70, and most preferably about 40 to about 55, calories per 8 ounces of the beverage composition.

In a preferred embodiment, the equivalent sucrose sweetness ratio of acesulfame potassium to aspartame is from about 0.45 to about 0.55. Preferably the equivalent sucrose sweetness ratio of acesulfame potassium and aspartame to the total sweetness present in the composition is from about 0.27 to about 0.60 and more preferably from about 0.35 to about 0.45. The two sweetness ratios insure that the perception of sweetness of the beverage does not vary significantly over time even though the concentration of aspartame decreases due to hydrolysis in a warm, acidic environment. In addition, the beverage does not have pronounced off-flavors of non-nutritive sweeteners.

In another embodiment, the nutritive sweetener is selected from the group consisting of invert sugar, sucrose, fructose, glucose and combinations thereof, preferably high fructose corn syrup. The beverage composition may include a juice selected from pear juice, grape juice, cranberry juice, raspberry juice, orange juice, grapefruit juice, pomegranate juice, blueberry juice and combinations thereof.

Artificial or added flavors that are non-juice components can be provided to the desired fruit juice taste If desired, the beverage may additionally contain vitamins, typically selected from one or more of ascorbic acid, vitamin $B_3$, vitamin $B_6$ and vitamin $B_{12}$. Supplementation of the beverage ensures that the beverage is nutritious despite its low juice content.

Typically, the beverage has a pH of less than about 3.5 more preferably about 3.2 or less. The beverage composition may contain citric acid, phosphoric acid and sodium citrate.

In another embodiment, the beverage composition contains a preservative system selected from the group consisting of sorbate, benzoate, EDTA and polyphosphate. Preferably, the beverage composition contains from about 800 to about 1200 ppm polyphosphate, from about 0.01% to about 0.02% sorbate and 0.01% to about 0.02% benzoate, all by weight of the total composition and from about 10 ppm to about 40 ppm EDTA. Preferably, the beverage contains water having a hardness of less than about 25 ppm as calcium carbonate. As a result of the preferred preservative system, the beverage has a long-shelf life free of microbial degradation without off-flavors from the preservatives. In addition, beverages preserved in accordance with the invention can be cold-filled.

In another embodiment, the beverage composition of claim 1 further comprising from about 1.5 to about 3.5, and more particularly, from about 1.9 to about 2.6 volumes of $CO_2$ per volume of beverage.

In accordance with another aspect of the invention, a beverage composition is provided. The beverage includes water, at least one nutritive sweetener, and at least one non-nutritive sweetener. The beverage also contains about 8% to about 12% juice by volume. The beverage has about 25 to about 70 calories per 8 ounce serving. The equivalent sucrose sweetness ratio of the at least one non-nutritive sweetener to all of the total sweeteners is from about 0.27 to about 0.60 and more preferably from about 0.35 to about 0.45.

In one embodiment, the total sweeteners include non-nutritive sweeteners, nutritive sweeteners and juice. The nutritive sweetener can be HFCS. The at least one non-nutritive sweetener can be a blend of aspartame and acesulfame potassium.

In another embodiment, the beverage is carbonated, which may be a relatively light carbonation such as at least about 1.5 volumes of $CO_2$ per volume of beverage.

DETAILED DESCRIPTION OF THE INVENTION

In one embodiment of the invention, a beverage composition includes water, at least one nutritive sweetener, at least one non-nutritive sweetener and about 8% to about 12% juice by weight of the total composition, nutritional supplements, a preservative system, and carbonation. The beverage composition has reduced calories with respect to juice with a content of from about 25 to about 70 calories per 8 ounces of the beverage composition while achieving a beverage that is tasty and shelf-stable without expensive processing or packaging requirements. It also has the appearance of a juice product.

The beverage includes at least one suitable nutritive sweetener. Suitable nutritive sweeteners include, for example, invert sugar, sucrose, fructose, glucose maltose, trehalose, rhamnose, corn syrups, fructo-oligosaccharides and combinations thereof. Preferred nutritive sweeteners include high fructose corn syrup (HFCS) and medium invert sugar.

The beverage includes at least one suitable non-nutritive sweetener. Suitable non-nutritive sweeteners include, for example, aspartame, acesulfame salts, saccharins, cyclamates, sucralose, alitame, neotame, steviosides, glycyrrhizin, Lo Han Guo, neohesperidin dihydrochalcone, monatin, monellin, thaumatin, brazzein, tagatose, and erythritol. Blends of non-nutritive sweeteners, such as a combination of acesulfame and aspartame, are preferred. Acesulfame potassium is a preferred form of acesulfame. The combination of acesulfame and aspartame has a flavor and sweetness that is superior to any one of the two sweeteners alone. Preferably, the acesulfame and aspartame are present in an amount so that the ratio of sucrose equivalent sweetness provided by acesulfame is from about 0.35 to about 0.70 and more preferably from about 0.45 to about 0.55. The ratio can be calculated by determining the sucrose equivalent sweetness contribution for both acesulfame and aspartame and calculating the ratio of the respective two sweetness contributions for those sweeteners. Preferably, the ratio of the sucrose equivalent sweetness contribution for the non-nutritive sweeteners to all of the total sweeteners in the beverage from whatever source, including any sugar or other sweetener present in the beverage, is from about 0.27 to about 0.48 or more, such as 0.5, 0.55 or 0.60 or more, with 0.35 to about 0.45 being a preferred range.

This carbonation of non-nutritive and nutritive sweeteners provides a beverage that is of reduced calories, typically from about only 25 to 70 calories per 8 fluid ounce serving, yet is good tasting with a substantially reduced artificial sweetener aftertaste. Consequently, beverages in accordance with the invention are attractive to consumers of both diet beverages and regular calorie beverages.

The use of non-nutritive sweeteners in the inventive sweetness ratios described above allows the beverage of the invention to have fewer calories without sacrificing the flavor and mouthfeel of nutritive sweeteners. In addition, it is known that aspartame will degrade over time in an acidic environment. The inventive sweetness ratios ensures that the overall sweetness impression of the beverage of the invention will not decrease significantly despite extended storage of the beverage in a warm environment. The sweetness stability feature of the beverage of the invention is important because the beverage is intended to be shelf stable.

Equivalent sweetness is calculated by converting the amount of artificial sweetener to equivalent sucrose solids based upon the known sweetness equivalence to sugar. Both aspartame and acesulfame potassium are about 200 times sweeter than sucrose. For HFCS, the sweetness equivalent is the same but a factor of 1.05263 is included to reflect that sucrose will invert over time while HFCS will not. For the juices in this example, all sugar solids were assumed to be sucrose although there are varying amounts of different sugars in each juice that varies both upon the individual juice and seasonality. If desired, the specific amount of each type of sugar present in a particular juice could be determined and the respective sucrose equivalent for each such sugar could be calculated.

Example Formula (Based on 100 Grams Total of Beverage)

| Ingredient | Wt % in Bev | Amt in 100 Grams | Sucrose Equivalent | % Sucrose Equivalent |
|---|---|---|---|---|
| Aspartame | 0.013 | 0.013 | 2.60(1.3 × 200) | 2.6% |
| Acesulfame Potassium | 0.006 | 0.006 | 1.20(0.6 × 200) | 1.2% |
| HFCS-55 (77% solids) | 4.664 | 4.664 | 3.41(466.4 × 0.77/1.05263) | 3.4% |
| Pear Juice Concentrate (70 Brix) | 1.41 | 1.41 | 0.99(141 × 0.70) | 1.0% |
| Orange Juice (65 Brix) | 0.372 | 0.372 | 0.24(37.2 × 0.65) | 0.2% |

The beverage includes about 8% to about 12% juice by volume of the total composition. If a juice concentrate is used, the juice content is measured based on the reconstituted single strength juice. The juice can be any suitable juice. The juice may also be supplemented by a non-juice fruit flavor. In another embodiment the fruit flavor is provided substantially or completely by non-juice flavor components. Suitable juices include apple juice, white grape juice, pear juice and combinations thereof. Such juices can be considered to be filler juices and can be present as the primary amount of juice, if desired. Flavor juices can be utilized also, typically at a lesser amount than the filler juice when present, such as a ratio of about 3:1 or more filler juice to flavor juice on a volume basis. Flavor juices that may be used, for example, include cranberry juice, raspberry juice, orange juice, grapefruit juice, pomegranate juice, blueberry juice and combinations thereof. The use of one or more key flavor juices and/or non-juice fruit flavor components allows beverages of the invention to deliver a good flavor despite the low quantities of juice used in the beverage.

Preferably, the beverage is nutritionally supplemented. Any suitable nutritional supplement may be used including electrolytes, minerals and vitamins. Preferably, the supplementation comprises ascorbic acid (vitamin C) and vitamins $B_3$, $B_6$ and $B_{12}$. Potassium and sodium are preferred electrolytes. Supplementation allows the beverage of the invention, if desired, to be similar nutritionally to higher-calorie juices.

Preferably, the beverage is preserved. Any suitable preservative system can be used and preferably the preservative system for a particular beverage provides microbiological stability for at least 17 weeks when stored at 70° F. In addition, preferably the beverage is shelf-stable for more than 17 weeks when stored at 70° F. It is desirable to use low hardness water, a low pH, and chemical preservatives in amounts that do not adversely impact the flavor of the beverage to an undesirable degree.

The low hardness water may be from any food-safe source. More preferably, the hardness of the water is less than about 25 ppm as calcium carbonate. The water may be naturally soft. Alternatively, the hardness of the water may be reduced by any suitable method including chemical softening, distillation or reverse osmosis.

The beverage has a pH of less than about 3.5, more preferably about 3.2 or less. To achieve the desired pH, acidulants can be used. Any suitable acidulant may be used. Suitable pH adjusters include, but are not limited to, phosphoric acid, citric acid, malic acid, lactic acid, tartaric acid, ascorbic acid and combinations thereof. A most preferred pH control system includes citric acid, phosphoric acid and a buffer salt, preferably sodium citrate.

The preservative system is selected from the group consisting of sorbate, benzoate, EDTA and polyphosphates and preferably combinations thereof.

Sorbate and benzoate are chemical preservatives. The chemical preservatives may be added to the beverage as sorbic acid, benzoic acid, alkali metal salts thereof and mixtures thereof. Preferred forms include sodium sorbate, sodium benzoate, potassium sorbate and potassium benzoate. Preferably the beverage contains from about 0.01% to about 0.02% sorbate and 0.01% to about 0.02% benzoate.

The polyphosphate preservative can be mixtures of different polyphosphates. Preferably the polyphosphates are sodium or potassium polyphosphates and mixtures thereof. More preferably, sodium polyphosphates are used. Sodium hexamentaphosphate is a preferred form of polyphosphate. Preferably, the average chain length of the polyphosphate is preferably from about 6 to about 21. Sodium polyphosphate having an average chain length of about 12 is especially preferred. Preferably, the beverage contains from about 800 to about 1200 ppm polyphosphate.

Food-safe chelators may also be used to preserve the beverage. Without wishing to be bound by theory, chelators are believed to enhance the potentiating effect of polyphosphates by chelating minerals necessary for microbial growth. Food-safe chelators include, but are not limited to, EDTA, particularly sodium EDTA and disodium calcium EDTA. Preferably, the beverage contains from about 10 ppm to about 40 ppm EDTA by weight. In some countries, the allowable maximum concentration of EDTA is 30 ppm. As used herein, the term "EDTA" means one or more of ethylenediaminetetraacetic acid and salts thereof.

The preferred beverage preservative system of the invention allows the beverage to be shelf stable without expensive retorting, aseptic process, tunnel pasteurization or cold storage. This makes the beverage economical to make and distribute while being very convenient for consumers and allows the beverage to be cold-filled.

The beverage may be carbonated or non-carbonated. Carbonated beverages generally contain 1.5 or more volumes of carbon dioxide at standard temperature and pressure per volume of beverage. Preferably the beverage contains from about 1.5 to about 3.5 and more particularly from about 1.9 to about 2.6 volumes of $CO_2$ per volume of beverage, all at standard temperature and pressure. Thus, the beverages in accordance with the invention may be lightly carbonated. Light carbonation makes a juice beverage more palatable, yet allows the beverage to be relatively rapidly consumed, if desired. In addition, when present, carbonation forms part of the preservative system as it helps to retard microbial growth.

If desired, the appearance of the beverage may be enhanced by the use of clouding agents and emulsions which simulate the cloudy appearance of certain juices and colorants.

The beverage of the invention may contain many other ingredients, as desired. The selection of ingredients may vary based on desired flavors for the beverage. Examples of optional additional ingredients include, but are not limited to, flavors, foaming agents, anti-foaming agents, hydrocolloids, polysaccharides, caffeine, coffee solids, tea solids, herbs, nutraceutical compounds, amino acids, other preservatives, and alcohol, as known in the art.

The beverage of the invention has a calorie content of from about 25 to about 70 calories, and in one embodiment about 40 to 55 calories, all per 8 ounces of the beverage composition and yet has great flavor, mouthfeel, and is nutritious. The beverage is shelf-stable while having stable sweetness despite using in certain embodiments aspartame which is susceptible to degradation in an acidic environment.

EXAMPLE

A formula for an orange flavored beverage of the invention is described in the table below. The beverage has a shelf life of at least 17 weeks when stored at about 70° F. The beverage has a brix of about 5%, a pH of about 3.1 and 45 calories per 8 oz serving. The beverage is carbonated with about 1.9 to about 2.6 volumes of $CO_2$ per volume of beverage. The beverage has a good flavor and is nutritious despite having only 10% juice by volume.

| Ingredient | wt % |
|---|---|
| Ascorbic Acid | 0.010 |
| Acesulfame Potassium | 0.006 |
| Aspartame | 0.013 |
| Potassium Sorbate | 0.013 |
| Potassium Benzoate | 0.020 |
| Antifoam Concentrate | 0.032 |
| Phosphoric Acid (52.5% by weight) | 0.055 |
| Sodium Hexametaphosphate | 0.098 |
| Citric Acid Anhydrous | 0.154 |
| Orange Flavor | 0.229 |
| Color | 0.001 |
| Calcium Disodium Edetate | 0.003 |
| Sodium Citrate | 0.013 |
| Citric Acid Anhydrous | 0.025 |
| Orange Juice 65 Brix | 0.372 |
| Pear Juice 70 brix | 1.410 |
| HFCS 55 (77% solids) | 4.664 |
| Vitamin Premix (Vitamins $B_3$, $B_6$ and $B_{12}$) | 0.002 |
| Treated Water (less than 25 ppm hardness as calcium carbonate) | 92.878 |

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

We claim:

1. A beverage composition comprising:
   at least one nutritive sweetener, acesulfame potassium and aspartame, said acesulfame potassium and aspartame being present in an equivalent sucrose sweetness ratio of acesulfame potassium to aspartame of from about 0.35 to about 0.70;
   the equivalent sucrose sweetness ratio of the acesulfame potassium and aspartame to all of the total sweeteners is from 0.27 to 0.60;
   about 8% to about 12% juice by volume of the total composition; and
   a calorie content of from about 25 to about 70 calories per 8 ounces of the beverage composition;
   wherein the beverage composition has a pH of less than about 3.5.

2. The beverage composition of claim 1 wherein said acesulfame potassium and aspartame being present in an equivalent sucrose sweetness ratio of from about 0.45 to about 0.55.

3. The beverage composition of claim 1 wherein the at least one nutritive sweetener is selected from the group consisting of invert sugar, sucrose, fructose, glucose and combinations thereof.

4. The beverage composition of claim 1 wherein the at least one nutritive sweetener comprises high fructose corn syrup.

5. The beverage composition of claim 1 wherein the juice is selected from pear juice, grape juice, cranberry juice, raspberry juice, orange juice, grapefruit juice, pomegranate juice, blueberry juice and combinations thereof.

6. The beverage composition of claim 1 further comprising ascorbic acid.

7. The beverage composition of claim 1 further comprising vitamins $B_6$ and $B_{12}$.

8. The beverage composition of claim 1 further comprising citric acid, phosphoric acid and sodium citrate.

9. The beverage composition of claim 1 wherein the beverage composition has a pH of less than about 3.2.

10. The beverage composition of claim 1 further comprising a preservative system selected from the group consisting of sorbate, benzoate, ethylenediaminetetraacetic acid and polyphosphate.

11. The beverage composition of claim 1 further comprising from about 800 to about 1200 ppm polyphosphate, from about 0.01% to about 0.02% sorbate and 0.01% to about 0.02% benzoate, all by weight of the total composition and from about 10 ppm to about 40 ppm ethylenediaminetetraacetic acid.

12. The beverage composition of claim 1 further comprising water having a hardness of less than about 25 ppm as calcium carbonate.

13. The beverage composition of claim 1 further comprising from about 1.5 to about 3.5 volumes of $CO_2$ per volume of beverage.

14. A beverage composition comprising:
water, at least one nutritive sweetener, and acesulfame potassium and aspartame;
about 8% to about 12% juice by volume of the total composition;
a calorie content of from about 25 to about 70 calories per 8 fluid ounces of the beverage composition;
said acesulfame potassium and aspartame being present in an equivalent sucrose sweetness ratio of acesulfame potassium to aspartame of from about 0.35 to about 0.70; and
the equivalent sucrose sweetness ratio of the acesulfame potassium and aspartame to all of the total sweeteners is from about 0.27 to about 0.60;
wherein the beverage composition has a pH of less than about 3.5.

15. The beverage composition of claim 14 wherein the at least one nutritive sweetener comprises high fructose corn syrup.

16. The beverage composition of claim 14 wherein the equivalent sucrose sweetness ratio of acesulfame potassium and aspartame to all of the total sweeteners is from about 0.35 to about 0.45.

17. A shelf-stable carbonated beverage comprising:
water having a hardness of less than about 25 ppm as calcium carbonate;
at least one nutritive sweetener and acesulfame potassium and aspartame,
about 8% to about 12% juice by volume of the total composition;
a pH of less than about 3.5;
a calorie content of from about 25 to about 70 calories per 8 ounces of the beverage composition;
the equivalent sucrose sweetness ratio of the acesulfame potassium and aspartame to all of the total sweeteners is from 0.27 to 0.60;
said acesulfame potassium and aspartame being present in an equivalent sucrose sweetness ratio of acesulfame potassium to aspartame of from about 0.35 to about 0.70;
at least about 1.5 volumes of carbon dioxide at standard temperature and pressure per volume of beverage; and
a preservative system comprising sorbate, benzoate, ethylenediaminetetraacetic acid and polyphosphate, present in effective amounts so that the beverage is shelf stable for at least 17 weeks when stored at 70° F.

* * * * *